UNITED STATES PATENT OFFICE.

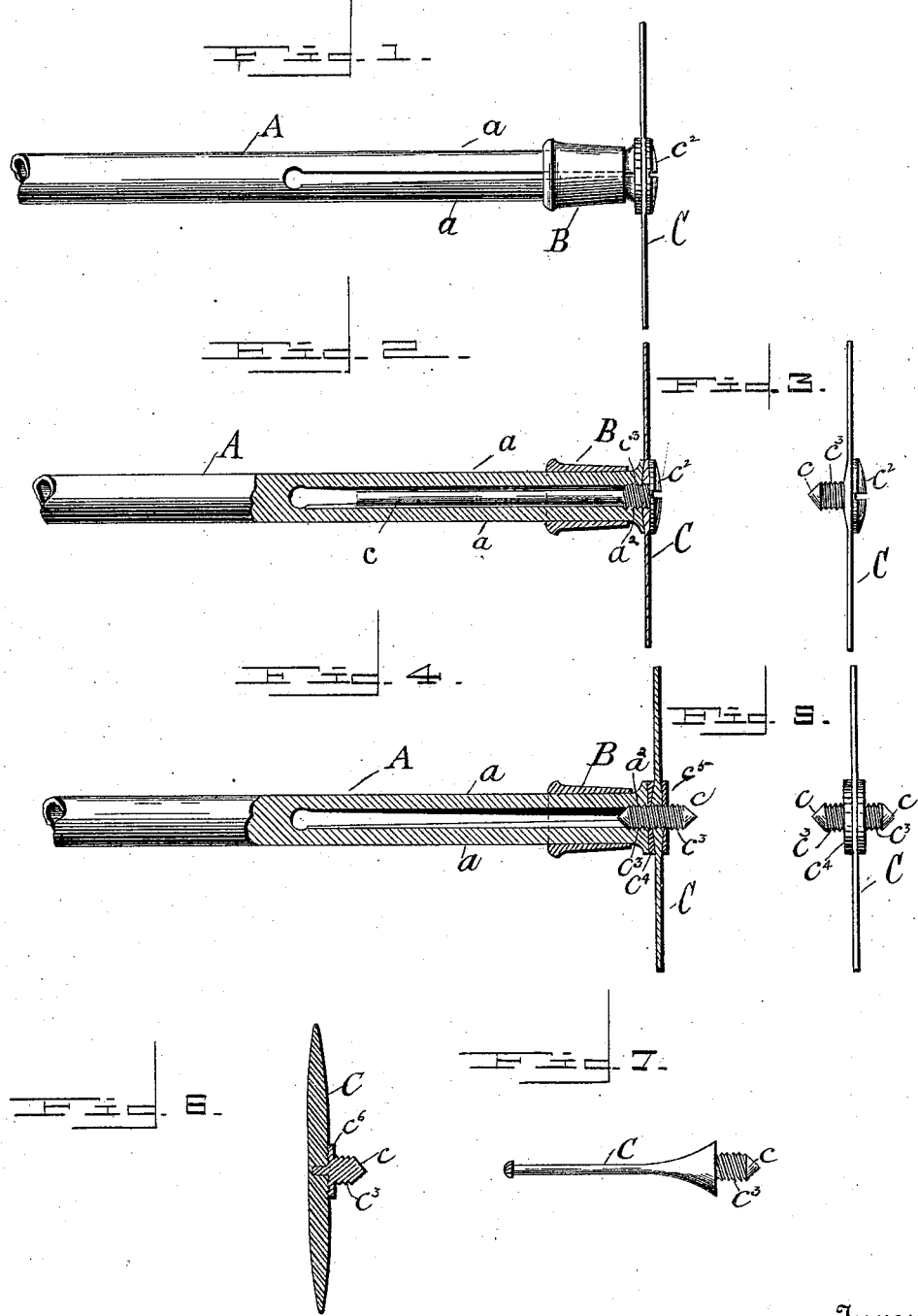

CHARLES L. ALEXANDER, OF CHARLOTTE, NORTH CAROLINA.

TOOL-HOLDER.

SPECIFICATION forming part of Letters Patent No. 551,610, dated December 17, 1895.

Application filed June 8, 1894. Serial No. 513,895. (No model.)

*To all whom it may concern:*

Be it known that I, CHARLES L. ALEXANDER, a citizen of the United States, residing at Charlotte, in the county of Mecklenburg and State of North Carolina, have invented certain new and useful Improvements in Dental-Disk Mandrels; and I do hereby declare the following to be a full, clear, and exact description of the invention, such as will enable others skilled in the art to which it appertains to make and use the same.

This invention relates to tool-holders.

The object is to produce a device, in the nature of a chuck, for holding disks, drill-tools, and the lighter lathe-tools, &c., by which the same may readily be inserted into or removed from the chuck, even while it is revolving at a high rate of speed, without inconvenience or interference with any of the moving parts; furthermore, to provide a mounting for disks by which they may be quickly reversed to facilitate a proper presentation to the work.

With these objects in view, the invention consists in a chuck or tool-holder comprising a mandrel socketed and split into two or more sections to form spring clamping-jaws, constituting a chuck, and a sleeve or collar encircling and movable on the mandrel, the binding action of the sleeve or collar on the clamping-jaws serving to grip and securely hold a tool-shank or the like placed in the socket, and the sliding of the sleeve along the mandrel serving to release the jaws, whereupon the tool-shank may readily be removed; furthermore, in a chuck or tool-holder comprising a mandrel socketed and split into two or more sections to form spring clamping-jaws, the socket being threaded or roughened, and a sleeve or collar encircling and movable on the mandrel, whereby on placing the threaded or roughened shank of a tool into the socket the threads or projections of the socket and the tool-shank will become interlocked, the binding action of the sleeve tending to retain the jaws in close engagement with the tool-shank; furthermore, in combination with a chuck, of a disk provided with a detachable threaded spindle by which it is retained in the chuck, and, finally, in details of construction.

In the accompanying drawings, forming part of this specification, and in which like letters of reference indicate corresponding parts, Figure 1 is a view in elevation showing a chuck comprising a mandrel socketed and split at one end to form spring clamping-jaws, a disk held in the chuck by having its spindle clamped in the socket by the spring-jaws, and the sliding sleeve encircling the mandrel at a point adjacent to the disk, to retain the jaws in engagement with the spindle. Fig. 2 is a view in central vertical longitudinal section showing the head of the mandrel concaved to receive the thickened portion of the disk. Fig. 3 is a detail view in elevation showing a modified form of spindle. Fig. 4 is a view in central vertical longitudinal section showing the threaded spindle of the disk clamped in the chuck, the spindle being flanged and projecting through a central opening in the disk and having a concave jam or lock nut thereon, by which the disk is removably clamped against the flange. Fig. 5 is a view in elevation showing the form of the flanged spindle of Fig. 4, with the disk held thereby the jam-nut detached from the chuck. Fig. 6 is a view in central vertical section showing a disk having a flanged spindle seated in a central socket, the flange on the spindle being corrugated on its inner face to retain the cement or adhesive material by which it is secured to the disk, and the spindle being threaded for engagement with the jaws of the chuck. Fig. 7 is a view in elevation showing a burr or cutting-tool provided with a threaded shank or spindle.

In the drawings, A represents the mandrel, preferably of steel, which is cleft or split to form two or more clamping-jaws $a$, the cleft or split being enlarged at its inner end, if desired, to give spring to the jaws, and also to serve as an escape for refuse which enters the space formed by the split or cleft, the other end of the split or cleft having a threaded or roughened socket $a^2$, designed to receive the shank of a tool. Encircling this mandrel is a movable sleeve or collar B, by which the spring-jaws are brought into and retained in engagement with the shank of a tool in the socket, or released to free the same.

C represents the tool proper or disk, which has detachably or securely fixed in the same a tool shank or spindle $c$.

In Figs. 1, 2 and 3, the spindle is shown as detachable from the tool or disk, and provided with a grooved head $c^2$. At a point $c^3$ adjacent to this head the spindle is screw-threaded or roughened for engagement with the jaws, which when forced downward upon and retained by the sliding collar interlock with the threads or projections of the spindle, the disk in this instance being clamped between the end of the mandrel, which is slightly concaved, and the head of the shank or spindle. The concavity in the end of the mandrel serves as a receiver for the portion of the disk immediately surrounding the central opening, which becomes more or less thickened when the disks are punctured.

In Figs. 4 and 5, the spindle is shown as detachably fixed to the disk, but differs from the form just described in that it is provided about centrally with a fixed collar or flange $c^4$, and the terminal head $c^2$ is dispensed with, the ends of the spindle being threaded and having another flange $c^5$ thereon, by which the disk is clamped securely against the collar or flange, these two flanges $c^4$ and $c^5$ forming a jam or lock nut. This form of mounting enables the operator to insert, remove, or reverse a tool without stopping the machine, it being only necessary to release the spring-jaws by sliding back the sleeve, when the threaded or roughened shank will at once become disengaged from the threaded or roughened jaws, and may be quickly removed and reversed or another tool inserted.

In Fig. 6 of the drawings, the spindle is shown as fixed to the disk by having one of its ends seated in a central socket thereof, and the face of the collar $c^6$ adjoining the disk being corrugated or concaved to receive the cement used in completing the connection.

It will be obvious from the foregoing that the extreme simplicity of construction and absence of small parts in my invention reduces the cost of manufacture to a minimum and that liability of breakage is entirely avoided, and, further, that the ease and rapidity with which a tool may be inserted into or removed from a continuously-revolving chuck saves great time and labor.

Having thus described my invention, what I claim as new, and desire to secure by Letters Patent, is—

A dental disk mandrel, comprising a mandrel, socketed and split into two or more sections to form spring clamping-jaws, the socket being interiorly threaded and having its end concaved, a sleeve or collar encircling and movable on the mandrel whereby to close the jaws, and a disk or other tool having a threaded shank for engaging the threads of the socket, and a head on the tool for engaging the concaved end of the mandrel, and thereby permit of a close end union between the mandrel and the tool, substantially as described.

In testimony whereof I affix my signature in presence of two witnesses.

CHARLES L. ALEXANDER.

Witnesses:
R. G. DYRENFORTH,
E. H. PARRY.